United States Patent
Yee et al.

(10) Patent No.: US 7,960,913 B2
(45) Date of Patent: Jun. 14, 2011

(54) ORGANIC LIGHT EMITTING DIODE DISPLAY DEVICE HAVING A SECOND BEZEL

(75) Inventors: Dong-Su Yee, Suwon-si (KR); Dai-Han Cho, Suwon-si (KR); Jung-Ho Hwang, Suwon-si (KR); Chan-Kyoung Moon, Suwon-si (KR); Hyun-Hee Lee, Suwon-si (KR); Min-Su Kim, Suwon-si (KR); Chan-Hee Wang, Suwon-si (KR); Kwang-Jin Yun, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 212 days.

(21) Appl. No.: 12/318,857

(22) Filed: Jan. 9, 2009

(65) Prior Publication Data
US 2009/0174825 A1    Jul. 9, 2009

(30) Foreign Application Priority Data

Jan. 9, 2008 (KR) .................. 10-2008-0002754
Aug. 11, 2008 (KR) .................. 10-2008-0078427

(51) Int. Cl.
*H01J 1/62* (2006.01)
*G02F 1/1333* (2006.01)

(52) U.S. Cl. .............................. 313/512; 349/58
(58) Field of Classification Search .......... 313/498–512; 349/58
See application file for complete search history.

(56) References Cited

FOREIGN PATENT DOCUMENTS

| KR | 10-2005-0070543 | 7/2005 |
| KR | 10-2007-0000698 | 1/2007 |
| KR | 1020070049547 A | 11/2007 |
| KR | 10-2008-0002379 | 1/2008 |

*Primary Examiner* — Joseph L Williams
(74) *Attorney, Agent, or Firm* — Robert E. Bushnell, Esq.

(57) ABSTRACT

An OLED display includes a display panel having a display area and a pad area, a first bezel receiving the display panel, and a second bezel combined with the first bezel along a display panel side where the pad area is formed.

28 Claims, 10 Drawing Sheets

ORGANIC LIGHT EMITTING DIODE DISPLAY DEVICE HAVING A SECOND BEZEL

CLAIM OF PRIORITY

This application makes reference to, incorporates the same herein, and claims all benefits accruing under 35 U.S.C. §119 from applications earlier filed in the Korean Intellectual Property Office on Jan. 9, 2008 and there duly assigned Serial No. 10-2008-0002754, and on Aug. 11, 2008 and there duly assigned Serial No. 10-2008-0078427, respectively.

BACKGROUND OF THE INVENTION

1. Field of the Invention

The present invention relates to an organic light emitting diode (OLED) display. More particularly, the present invention relates to a module for an OLED display.

2. Description of the Related Art

In general, an OLED display is constructed with a display panel including two substrates that are fixed by a sealant, a bezel that is combined to the display panel, and a printed circuit board that is electrically connected to the display panel through a flexible printed circuit (FPC), collectively forming a module.

Unlike a liquid crystal display (i.e., a LCD) in which a structure such as a backlight unit is positioned between the display panel and the bezel, in an OLED, because no structure exists between the display panel and the bezel, any impact is directly transmitted to the display panel; this transfer of impact occurs in a sudden situation such as when the device is dropped, whereby the display panel may be easily damaged.

More particularly, when the force that results from an external impact is applied, the impact is concentrated on a partially cut-out portion of a bezel that has been bent during fabrication in order to accommodate the FPC without interference; the cut-out portion is weaker in mechanical strength in comparison to other portions of the bezel.

Therefore, when the OLED display has characteristics such that it is not easily broken by being dropped due to a user's mistake or accidental drop of the OLED display, the OLED display is able to function as an excellent display device.

The above information disclosed in this Background section is only for enhancement of the understanding of the background of the invention and therefore it may contain information that does not constitute the prior art that is already known in this country to a person of ordinary skill in the art.

SUMMARY OF THE INVENTION

It is therefore, an object of the present invention to provide an improved OLED display and an improved method for manufacturing an OLED display.

It is another object to provide a structural support for a display that is able to minimized deleterious application of external forces to the components of the display encased by the structural support.

The present invention has been made in an effort to provide an organic light emitting diode (OLED) display having excellent mechanical strength.

An exemplary OLED display constructed as one embodiment of the principles of the present invention may include a display panel having a display area and a pad area, a first bezel receiving the display panel, and a second bezel combined with the first bezel in the display panel side where the pad area is formed.

The second bezel may be detachably combined to a side of the first bezel.

The second bezel may be combined to only a side of the first bezel corresponding to the pad area.

The first bezel may include a bottom portion, a first skirt portion formed by protruding from an edge of the bottom portion, and a cut-out skirt portion formed by being partially cut out from the first skirt portion; the second bezel may include a second skirt portion and a bent portion formed from the second skirt portion.

An additional skirt portion having a locking projection may be formed on a side of the first skirt portion, and the bent portion may be inserted into the locking projection.

The first skirt portion may include a plurality of protrusions, the second skirt portion may include a plurality of holes corresponding to the plurality of protrusions, and the protrusions may be inserted into the holes.

A front end of the bent portion may form a supporting unit by being bent to be aligned in parallel with the bottom portion.

The supporting unit may be disposed on the pad area.

The OLED display may also include a touch panel disposed on the display panel, and the touch panel may be firmly held in position by the supporting unit.

The first bezel may include a bottom portion, a first skirt portion formed to protrude from an edge of the bottom portion, and a cut-out skirt portion formed by being partially cut out from the first skirt. The second bezel may include a cover portion that covers the pad area and a second skirt portion formed by protruding from an edge of the cover portion.

The first skirt portion and the cut-out skirt portion may include a plurality of protrusions. The second skirt portion may include a plurality of holes corresponding in position to the plurality of protrusions. The protrusions may be inserted into the holes.

The first bezel and the second bezel may be different in terms of mechanical strength and rigidity.

The first bezel may include a material selected from a group of structural materials such as steel use stainless (SUS), steel plate cold commercial (SPCC), aluminum, and a nickel-silver alloy.

The display device may be a portable device that is readily amenable to be hand carried by a user over a substantial distance.

An exemplary OLED display constructed as another embodiment of the present invention may include a display panel including a display area and a pad area that is formed in one side of the display area, a first bezel that receives the display panel, and a second bezel combined with the first bezel on the pad area to form a gap with the pad area. The first bezel may include a penetration hole formed corresponding to the pad area, and the second bezel may bear a protrusion formed in correspondence with the position and orientation of the penetration hole in order to absorb external pressure applied to the second bezel while the protrusion moves within the penetration hole.

The first bezel may include a bottom portion that supports the display panel, a skirt portion formed to be bent to correspond to three sides of the display panel in an area of the bottom portion and that corresponds to the display panel, and a hemming flange formed to be bent to correspond to one side other than the three sides of the display panel in an area of the bottom portion and that corresponds to the pad area. The penetration hole may be formed in one side of the hemming flange of the bottom portion.

The second bezel may include an upper plate that covers the pad area and a side plate that is bent from lateral ends of the upper plate and is combined with the skirt portion of the first bezel. The protrusion may be formed to protrude toward the penetration hole and to be bent from the hemming flange side in the upper plate and form the bottom portion.

Penetration holes may be formed in a plurality of locations along the length direction of the hemming flange.

The penetration hole may be formed to correspond in position and orientation to at least the lateral ends of the length direction and to a center of the hemming flange.

The penetration hole may be formed to correspond to a center of an integrated circuit (IC) chip provided at least in the pad area.

The protrusion may include a wide width portion that is bent to the penetration hole in the upper plate and formed to be wider than the width of the penetration hole, and a narrow width portion extending from the wide width portion and formed to be smaller than the width of the penetration hole so as to be configured to be physically combined with the penetration hole.

The wide width portion of the protrusion and the first bezel of the penetration hole may form a first gap interposed between the wide width portion and the first bezel. The narrow width portion of the protrusion may be penetrated by the penetration hole and to protrude to the rear side of the bottom portion, and a set that supports the bottom portion and the narrow width portion may form a second gap interposed between the bottom portion and the narrow width portion. The first gap may be set to be less than the second gap.

The OLED display constructed as an embodiment of the present invention may include a flexible printed circuit board (FPC) connected to the pad area and bent to conform to the shape of the rear side of the bottom portion of the first bezel while surrounding the hemming flange, and the FPC may form a protrusion hole that penetrates the protrusion of the second bezel.

The protrusion hole may face at least one of a plurality of penetration holes.

An OLED display constructed as another embodiment of the present invention may include a display panel including a display area and a pad area formed in one side of the display area, a first bezel that receives the display panel, and a second bezel formed in a square shape corresponding to the pad area. The second bezel may be combined to the first bezel at three sides among the four sides that correspond to the pad area.

The second bezel may be fixedly combined with the first bezel at lateral ends of the pad area, and may be elastically combined to the first bezel along one side of the pad area.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
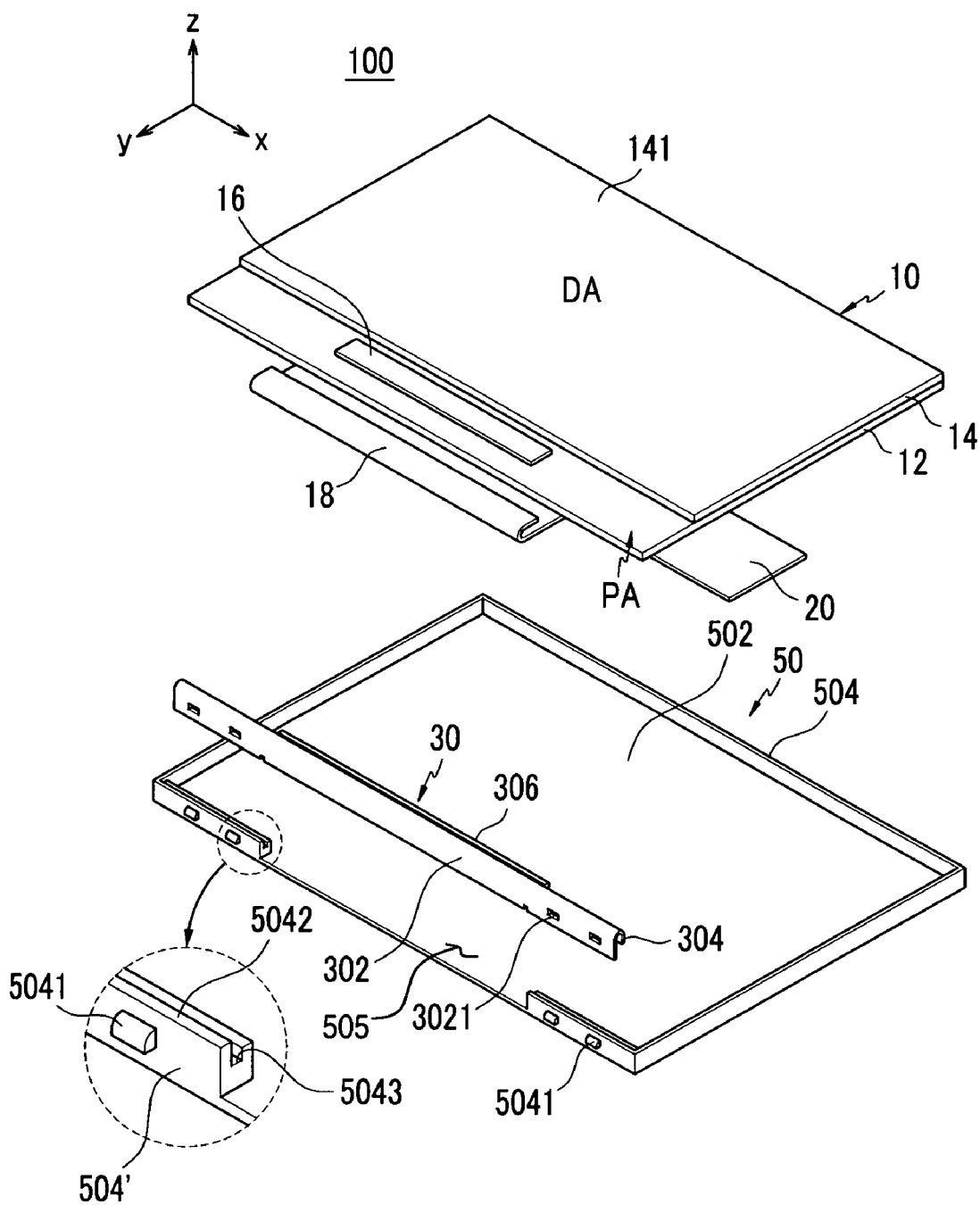
FIG. 1 is an exploded oblique view of an organic light emitting (OLED) display constructed as a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of principles of the present invention.

Accordingly, the drawings and description are to be regarded as illustrative in nature and not restrictive of the various features and assemblages which may be constructed as alternative embodiments in the practice of the present invention. Like reference numerals designate like elements throughout the specification.

In order to clarify the features of the multiple layers and regions of these several embodiments, the thicknesses of the layers are enlarged in the drawings. It will be understood that when an element such as a layer, film, region, or substrate is referred to as being "on" another element, it may be either mounted directly on the other element or intervening elements may also be present. In contrast, when an element is referred to as being "directly on" another element, there are no intervening elements present or positioned in between these elements.

Throughout this specification and the claims that follow, when an element is described as being "coupled" to another element, the element may be "directly coupled" to the other element or may be "electrically coupled" to the other element through a third element. In addition, unless explicitly described to the contrary, the word "comprise" and variations such as "comprises" or "comprising" will be understood to imply the inclusion of the stated elements but not the exclusion of any other elements.

Figure 2:
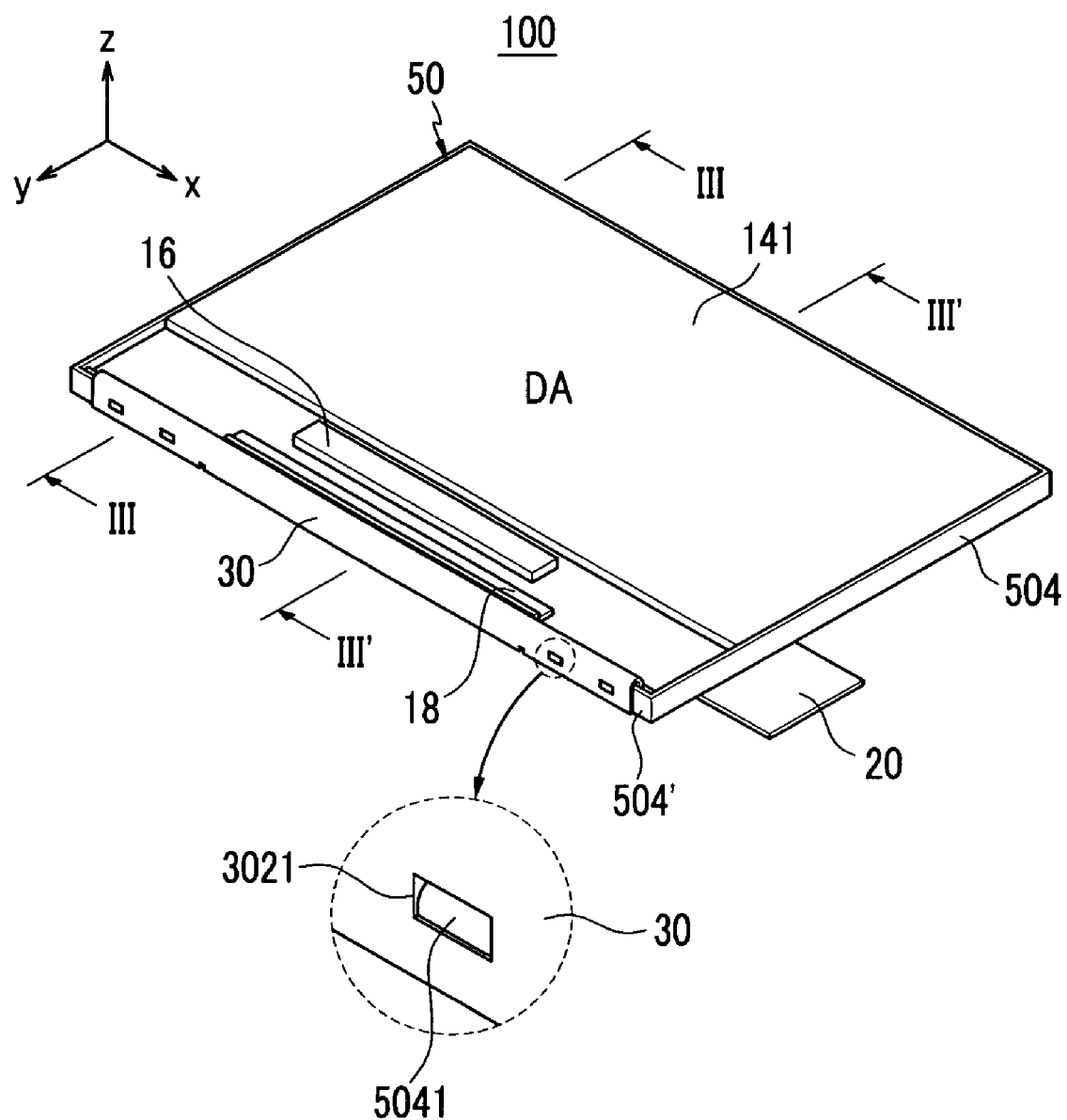
FIG. 2 is an oblique view of the OLED display shown in FIG. 1 in an assembled state.

Referring now to FIG. 1 and FIG. 2, an organic light emitting diode (OLED) display 100 includes a display panel 10 that displays an image, a first bezel 50 that receives the display panel 10, and a second bezel 30 that protects the display panel 10 by being combined to the first bezel 50.

The display panel 10 may be provided, for example, for a mobile terminal such as a touch panel (or touch screen) type of cellular phone. In an exemplary embodiment of the present invention, however, the display panel 10 may be provided for a display with a large size such as a television in addition to the mobile terminal.

The display panel 10 includes a first substrate 12 and a second substrate 14 that is smaller than the first substrate 12. A display area DA in which an image is substantially displayed in formed in the display panel 10. For example, when the display device 100 has an active matrix (AM) structure, an organic light emitting diode (OLED), and a thin film transistor (TFT) for driving the OLED, wires electrically connecting the OLED and the TFT may be formed on first substrate 12 within a region corresponding to the display area DA. In addition, in the first substrate 12, a pad area PA is formed in a portion that extends beyond the edge of the second substrate 14, and pads (not shown) that extend from the wires of display area DA are positioned in the pad area PA. The pads are electrically connected to a printed circuit board (PCB) 20 through a flexible printed circuit board (PFC) 18.

An integrated circuit (IC) chip 16 is provided in the pad area PA of the first substrate 12 to control the display panel 10. IC chip 16 generates a plurality of timing signals for applying a data driving signal and a gate driving signal at appropriate points in time. IC chip 16 applies each of the signals to a data line (now shown) and a gate line (not shown) of display panel 10. A passivation layer (not shown) is formed around IC chip 16 to protect IC chip 16.

In the FPC 20, electronic circuit elements (not shown) for processing a driving signal are mounted and a connector (not shown) for transmitting an external signal to FPC 20 is provided. In a state in which the display panel 10 is received in first bezel 50, FPC 18 is attached to display panel 10 and is bent to extend to the rear side of the bezel 50 so that PCB 20 is positioned at a rear surface of first bezel 50.

First bezel 50 is provided on a lower side of display panel 10, to receive display panel 10, and is fixedly installed in a case of an actual appliance or electronic product.

First bezel 50 includes a first bottom portion 502 corresponding in surface area to the size of display panel 10 and first skirt portion 504 that is oriented in disposition to be perpendicular with a predetermined height from an edge of the first bottom portion 502. Here, a section (or space) 505 of a length along one side of first skirt portion 504 in which the FPC 18 is disposed, is cut out in consideration of, and in conformance with, the size of FPC 18 so that FPC 18 may be positioned without interference.

In a case in which first skirt portion 504 from which a partially cut-out section 505 is removed from one side of first skirt portion 504, remaining lengths (or cut-out skirt portion) 504' of first skirt portion 504 extend from opposite sides of cut-off section 505 and join the opposite sides of skirt portion 504. A plurality of spaced-apart protrusions 5041 are formed along the remaining lengths of skirt portion 504'. A plurality of protrusions 5041 that are convex, extend from an external surface of the remaining lengths 504' on the cut-out side of first skirt portion 504, and toward the +y-axis direction of FIG. 1. In addition, as shown in the enlarged circle of FIG. 1, an additional skirt portion 5042 having a locking projection 5043 is formed as a rabbet in a side of the remaining lengths 504' along this side of first skirt portion 504.

The second bezel 30 is positioned within the cut-out section 505 between the remaining lengths 504' on the cut-out side of first bezel 50, and is functionally combined with first bezel 50. Accordingly, as shown in FIG. 2, the second bezel 30 protects the cut-out section 505 by surrounding and filling cut-out section 505 while the display panel 10 is received within first bezel 50.

The second bezel 30 includes a second skirt portion 302 that is aligned in parallel with the remaining lengths 504' on opposite ends of cut-out section 505, and a bent portion 304 that is bent toward the inner side of the first bezel 50 toward the −z-axis direction of FIG. 1 from the second skirt 302, thereby forming a U-shaped rim along the upper length of second bezel 30. Here, a part of the bent portion 304 forms a supporting unit 306, shown in greater detail in FIG. 3B, that is bent again, upwardly and toward the −y-axis of FIG. 1 from the bent portion 304. Bent portion 304 embraces both the exterior and interior surfaces of the sidewall formed by the remaining lengths 504' of first skirt portion 504, on opposite sides of cut-out section 505.

In the second skirt portion 302, a plurality of holes 3021 are formed in correspondence with the positions of each of the plurality of protrusions 5041 formed on the outside wall of remaining lengths 504'. For combination of the first bezel 50 and the second bezel 30, when the bent portion 304 of the second bezel 30 is pushed to be inserted in the locking projection 5043 of the first bezel 50, the second bezel 30 moves down along the slope of the protrusion 5041. Protrusion 5041 is inserted into the hole 3021, and accordingly the protruding end portions of each of protrusions 5041 is received with, and locked in, corresponding holes 3021. Therefore, second bezel 30 can be mated with, and fixedly attached to first bezel 50 while being combined with the longitudinally opposite remaining lengths 504' spaced-apart by cut-out section 505 of the first bezel 50. The combination of first bezel 50 and second bezel 30 is not limited to this particular technique.

In a structure in which the second bezel 30 surrounds the cut-out section 505 while being combined to the first bezel 50, the second bezel 30 replaces the space in which the cut-out section of skirt 504 has been removed from between longitudinally opposite remaining lengths 504'.

Accordingly, for an exposed space 505 between the remaining lengths 504' with respect to the z-axis, the second skirt portion 302 of the second bezel 30 is disposed in the exposed portion connects the remaining lengths 504'.

Therefore, although external impact such as would be caused by a drop impact of the assembled display, is applied to OLED display 100, the impact is uniformly distributed along the four (i.e., +x-axis, −x-axis, +y-axis, and −y-axis) axes of first bezel 50 so that concentration of the impact to cut-out section 505 may be prevented.

The first bezel 50 and the second bezel 30 may be made of the same material or, alternatively, may be made from materials that are different in strength, elasticity or density.

Since the first bezel 50 receives internal parts including the display panel 10 while supporting those internal parts, first bezel 50 may be made of a material having high strength in order to protect the internal parts. For example, the first bezel 50 may be made of a metal material such as steel use stainless (SUS) having constant strength, steel plate cold commercial (SPCC), aluminum, and a nickel-silver alloy. Therefore, the display panel 10 can be efficiently protected from the external impact. The material from which first bezel 50 is fabricated, is not limited to these materials.

The second bezel 30 may be made of a metallic material like the first bezel 50, or alternative, may be made of a resin material.

Figure 3A:
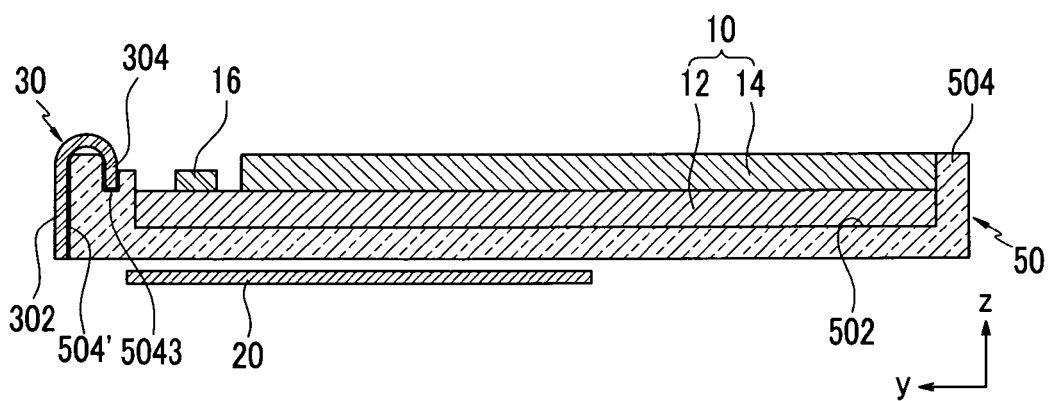
FIG. 3A is a cross-sectional view of FIG. 2, taken along the sectional line III-III.
Figure 3B:
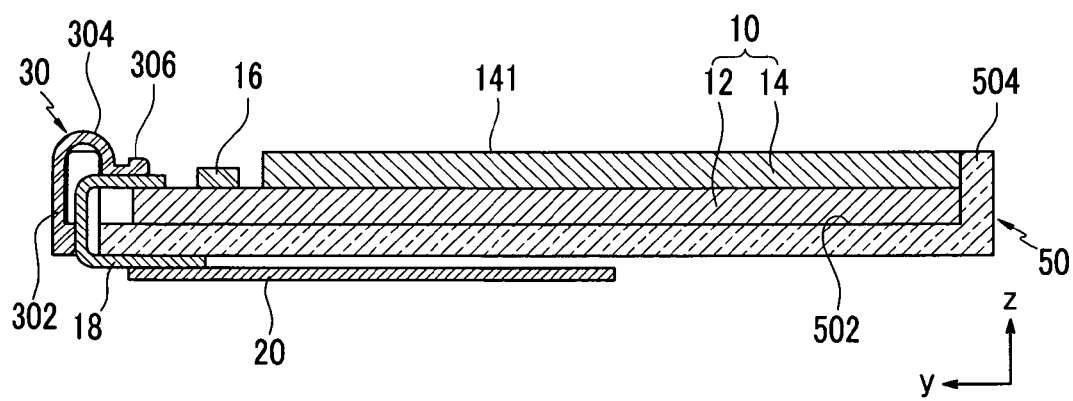
FIG. 3B is a cross-sectional view of FIG. 2, taken along the sectional line III'-III'.

FIG. 3A is a cross-sectional view of FIG. 2, taken along sectional line III-III, and FIG. 3B is a cross-sectional view of FIG. 2, taken along sectional line III'-III'.

Referring to FIG. 3A and FIG. 3B, the display panel 10 is received within first bezel 50, and the second bezel 30 is combined to one side of first bezel 50. In this case, the second skirt portion 302 of the second bezel 30 contacts the remaining portions 504' along the cut-out side of first bezel 50, and a front end of the bent portion 304 is inserted into the rabbet formed by locking projection 5043 of the additional skirt portion 5042. A portion of the bent portion 304, that is, a portion of the bent portion 304 located corresponding to cut-out section 505 of the first bezel 50, is located along the width of FPC 18 while providing supporting unit 306 formed by bending the terminal edge of bent portion 304 upward and toward the −y-axis direction.

That is, as shown in FIG. 3B, the second bezel 30 protects the FPC 18 while the second skirt portion 302 covers and surrounds the cut-out section 505 between the remaining lengths 504' of skirt portion 504. Accordingly, mechanical strength of the cut-out section 505, as well as remaining lengths 504' is reinforced along this side of skirt 504, and damage to the FCP 18 can be minimized, or prevented, by protecting the FCP 18 from the external environment.

Further, an upper end of a bent portion of the second bezel 30, formed by the bent portion 304, is higher than that of a light emitting surface 141 of the display panel 10 with respect to the z-axis of FIG. 3B. Thus, when the OLED display 100 is dropped by a user's carelessness, the bent portion reaches the ground before the display panel 10 reaches the ground so that external impact can be absorbed.

The OLED display 100 according to the present exemplary embodiment may further interpose a buffering tape (not shown) between the display panel 10 and the bottom portion 502 of the first bezel 50 in order to buffer the external impact of the OLED display 100. For example, the buffering tape is referred to as a phorone tape.

Figure 4:
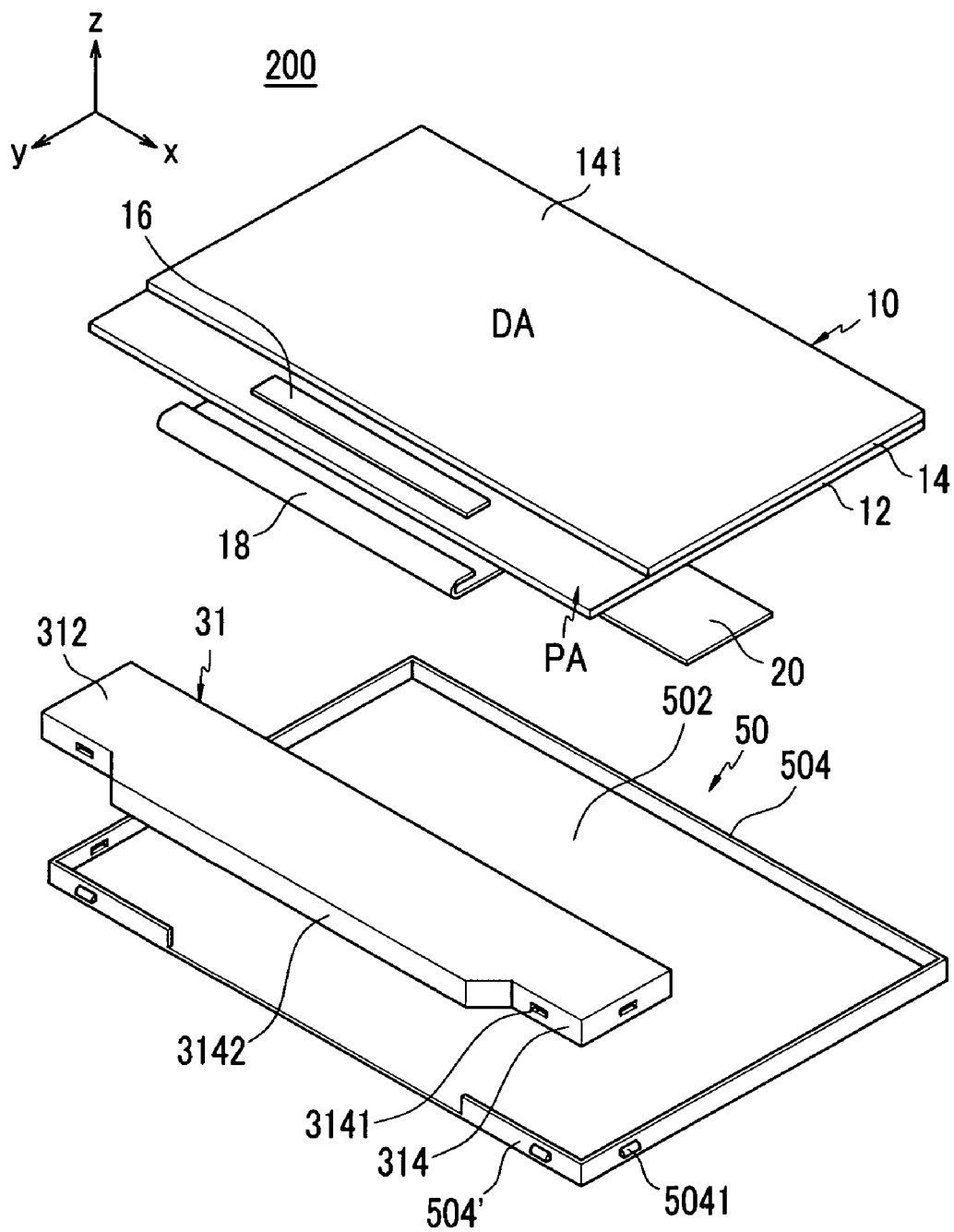
FIG. 4 is an exploded oblique view of an OLED display device constructed as a second exemplary embodiment of the present invention.
Figure 5:
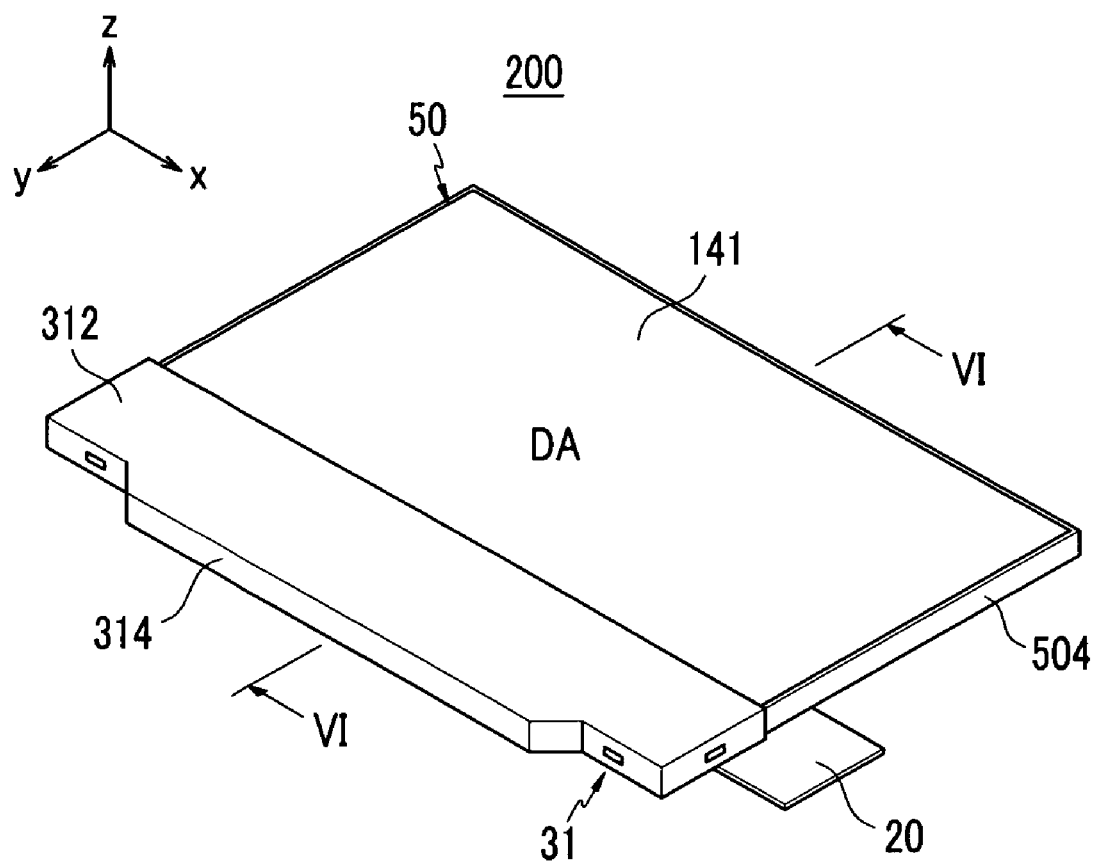
FIG. 5 is an oblique view of the OLED display device shown in FIG. 4, in an assembled state.

FIG. 4 is an exploded perspective view of an OLED display 200 according to a second exemplary embodiment of the present invention, and FIG. 5 is a perspective view showing that a display panel of FIG. 4 is received in a first bezel 50 and a third bezel 31 is combined to the first bezel 50. In FIG. 4 and FIG. 5, like reference numerals will be used for elements of the OLED display 100 of FIG. 1 and FIG. 2, and detailed descriptions for this will be omitted.

Referring to FIG. 4 and FIG. 5, the OLED display 200 includes the third bezel 31.

The third bezel 31 is combined to the first bezel 50, and protects a pad area PA of the display panel 10 by covering it while surrounding a part of a first skirt portion 504 of the first bezel 50.

The third bezel 31 includes a cover portion 312 that is parallel with a bottom portion 502 of the first bezel 50 and covers the pad area PA and a part of a light emitting surface 141, and a third skirt portion 314 perpendicular formed from an edge of the cover portion 312.

The third skirt portion 314 and the first skirt portion 504 are formed protruded to opposite directions from the cover portion 312 and the bottom portion 502, respectively. That is, the third skirt portion 314 may be protruded to the −z-axis direction from the cover portion 312, and the first skirt portion 504 may be protruded to the +z-axis direction from the bottom portion 502. Here, a part of the third skirt portion 314 is formed by being protruded from an external surface of the third skirt portion 314, and this part corresponds to a cut-out section of a cut-out skirt portion 504'. Thus, while the third bezel 31 is combined to the first bezel 50, a protruded portion 3142 of the third skirt portion 314 can be located outside of the FPC 18 without interference with the FPC 18.

In addition, in the third skirt portion 314, a plurality of second holes 3141 are formed corresponding to locations of protrusions 5041 formed in the cut-out skirt portion 504' and the first skirt portion 504. A method for combining the protrusion 5041 and the second hole 3141 is the same as the combining method of the protrusion 5041 and the first hole 3021 of the first exemplary embodiment.

As described, when the third bezel 31 is provided, the third skirt portion 314 reinforces mechanical strength of the cut-out skirt portion 504' and protects the FPC 18 from being externally exposed. In addition, since a cover portion 312 of the third bezel 31 covers the pad area PA, an integrated circuit (IC) chip 16 located in the pad area PA is not externally exposed so that damage to the IC chip 16 due to impact can be prevented.

The first bezel 50 and the third bezel 31 may be made of the same material or may be made of materials that are different in strength. That is, the third bezel 31 can be made of a metallic material like the first bezel 50, or of a resin material.

Figure 6:
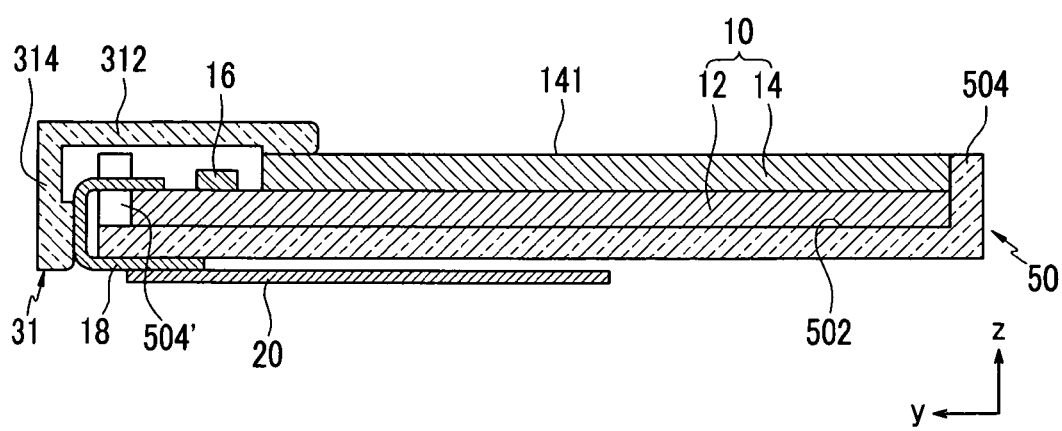
FIG. 6 is a cross-sectional view of FIG. 5, taken along the sectional line VI-VI.

FIG. 6 is a cross-sectional view of FIG. 5, taken along the line VI-VI.

Referring to FIG. 6, the display panel 10 is received in the first bezel 50, and the third bezel 31 is combined to one side of the first bezel 50. In this case, the third skirt portion 314 of the third bezel 31 is located outside of the cut-out skirt portion 504' of the first bezel 50 and the FPC 18 to protect them. The cover portion 312 of the third bezel 31 is disposed on the IC chip 16 and partially covers the light emitting surface 141 of the display panel 10. Accordingly, mechanical strength of the cut-out skirt portion 504' is reinforced, and the FPC 18 and the IC chip 16 can be protected from the external environment.

Further, the height of a front-end of the cover portion 312 is higher than the height of the light emitting surface with respect to the z-axis of FIG. 5. Thus, when the OLED display 100 is dropped due to a user's carelessness, the cover portion 312 reaches the ground before the display panel 10 so that external impact can be absorbed.

Figure 7:
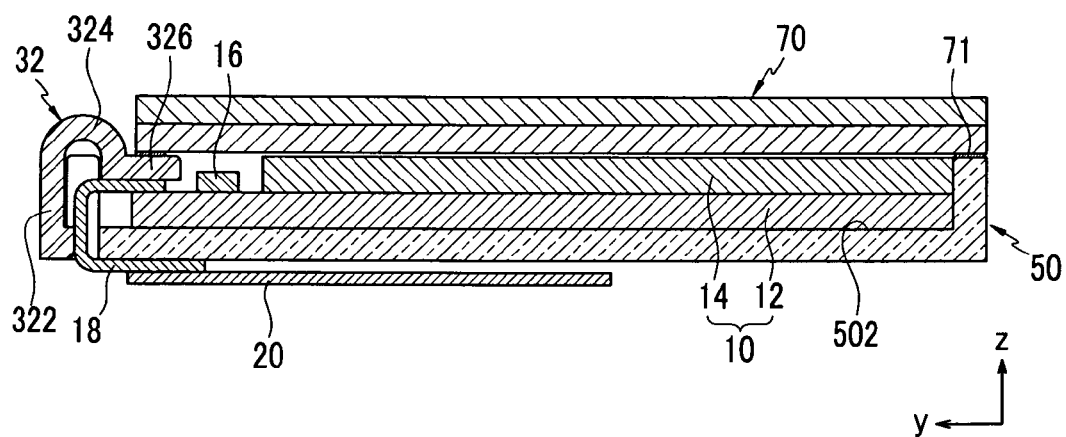
FIG. 7 is a cross-sectional view of an OLED display device constructed as a third exemplary embodiment of the present invention.

FIG. 7 shows a cross-section of an OLED display 300 according to a third exemplary embodiment of the present invention. The OLED display 300 of FIG. 7 is one exemplary application of a touch panel 70 to the OLED display 100 of FIG. 1, and like reference numerals will be used for elements of the OLED display 100 of FIG. 7 identical to those of FIG. 2, and detailed descriptions for this will be omitted.

Referring to FIG. 7, the OLED display 300 includes a fourth bezel 32 and a touch panel 70.

The touch panel 70 is disposed on the display panel 10, and for example, when a user presses the touch panel 70, a signal corresponding to the pressure is transmitted to an IC chip 16 of the display panel 10, and accordingly an image can be displayed in the display panel 10. The touch panel 70 can be combined to the display panel 10 by using an additional adhesive tape 71. However, a method for combining the touch panel 70 and the display panel 10 is not limited thereto. In addition, a further detailed description for the touch panel will be omitted since it can be understood by a person of ordinary skill in the art.

The fourth bezel 32 is similar to the second bezel 30 of the first exemplary embodiment shown in FIG. 1 in shape, and includes a third skirt portion 322, a third bending unit 324, and a third supporting unit 325 that respectively correspond to the second skirt portion 302 of the second bezel 30, the bending unit 304, and the supporting unit 306.

Here, the third supporting unit 326 is bent to the -y-axis direction from the third bending unit 324. In this case, the touch panel 70 is disposed on the third supporting unit 326 so that the third supporting 326 can support the load of the touch panel 70.

Therefore, like the second bezel 30 of the first exemplary embodiment, the fourth bezel 32 can reinforce the relatively weak strength of the cut-out skirt portion 504', protect the FPC 18, and support the touch panel 70 disposed on the display panel 10 so that damage to the display panel 10 due to the load of the touch panel 70 can be effectively prevented.

The OLED displays 100, 200, and 300 are installed in a case that configures an actual product and displays a user-desired image.

The OLED displays 100, 200, and 300 according to the first to third exemplary embodiments of the present invention can reinforce mechanical strength by other bezels 30, 31, and 32 that are combined to the first bezel 50, and this will now be described in further detail.

The inventor of the present invention measured bending strength of the OLED display 100 of the first exemplary embodiment and an OLED display of a comparative example by mounting the respective displays in separate bending test devices. Here, the OLED display of the comparative example is not provided with a side bezel like the second bezel 30.

The bending test is performed by mounting each of the OLEDs in the separate bending test devices (in this case, lateral ends of the OLED displays are supported by being disposed in a lower portion thereof) and pressing the center portion of the OLED at 5 mm/min. Thus, when the center portion of the OLED display is sagged in the pressure direction, the sagging amount (displacement) and repulsive force (strength) are measured. Here, the displacement and the strength are measured until the moment that the OLED display is damaged. For the bending test, 20 OLED displays were respectively prepared for the exemplary embodiment and the comparative example, and results 1 (maximum value, minimum value, average, and standard deviation among measured values) of the bending test are shown in Table 1.

TABLE 1

|  | Sagging amount (displacement) [mm] | | Repulsive force (strength) [kg] | |
| --- | --- | --- | --- | --- |
|  | Exemplary Embodiment | Comparative Example | Exemplary Embodiment | Comparative Example |
| Maximum value | 3.3 | 3.5 | 13.13 | 10.16 |
| Minimum value | 2.1 | 1.7 | 9.28 | 5.82 |
| Average value | 2.5 | 2.8 | 10.64 | 8.68 |
| Standard deviation | 0.3 | 0.4 | 0.94 | 1.10 |

Referring to Table 1, in the case of the exemplary embodiment, the average and the standard deviation of the sagging amount are respectively 2.5 mm and 0.3, and the average and the standard deviation of the repulsive force are respectively 10.64 kg and 0.94. Compared to this, in the case of the comparative example, the average and the standard deviation of the sagging amount are respectively 2.8 mm and 0.4, and the average and the standard deviation of the repulsive force are respectively 8.68 kg and 1.10. That is, the bending test results of the exemplary embodiment show that the mechanical strength to physical force is further improved in the exemplary embodiment since the sagging amount is small and the strength value is large compared to the comparative example.

According to the above exemplary embodiments, the display panel is received by using a bottom bezel (i.e., the first bezel) and a side bezel (i.e., the second bezel), and the side bezel can reinforce a portion that has relatively weak mechanical strength compared to other portions of the bottom bezel.

Accordingly, when the display panel is dropped due to a user's carelessness, the impact can be uniformly distributed to the bezel, and the bezel absorbs the impact before the display panel so that the display panel can be effectively protected, thereby improving mechanical strength of the OLED display.

Figure 8:
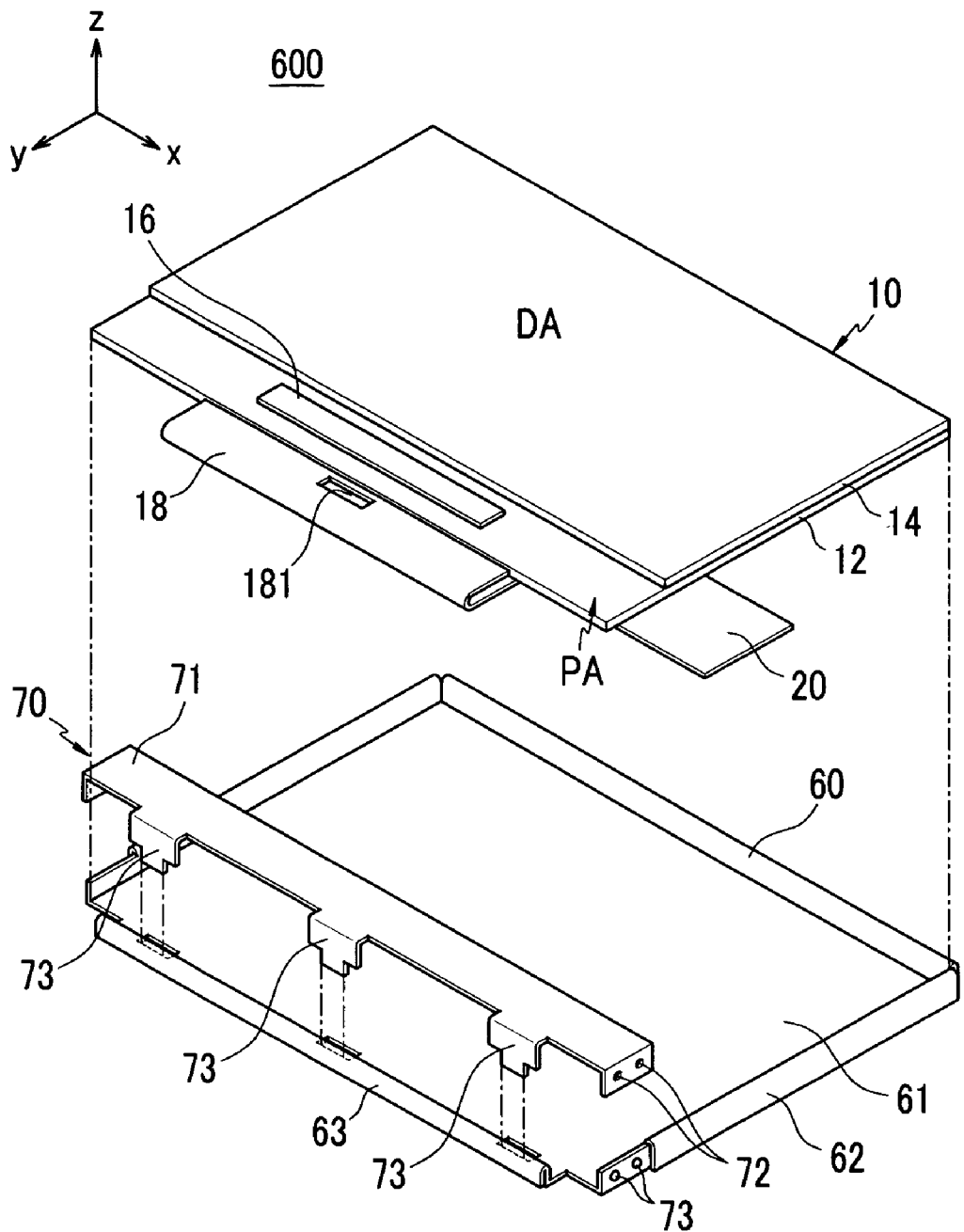
FIG. 8 is an exploded oblique view of an OLED display device constructed as a fourth exemplary embodiment of the present invention.

FIG. 8 is an exploded perspective view of an OLED display according to an exemplary embodiment of the present invention.

Referring to FIG. 8, an OLED display 600 according to the present exemplary embodiment includes a display panel 10 that displays an image, a first bezel 60 that receives the display panel 10, and a second bezel 70 combined to the first bezel 60 to protect the display panel 10.

Figure 12:
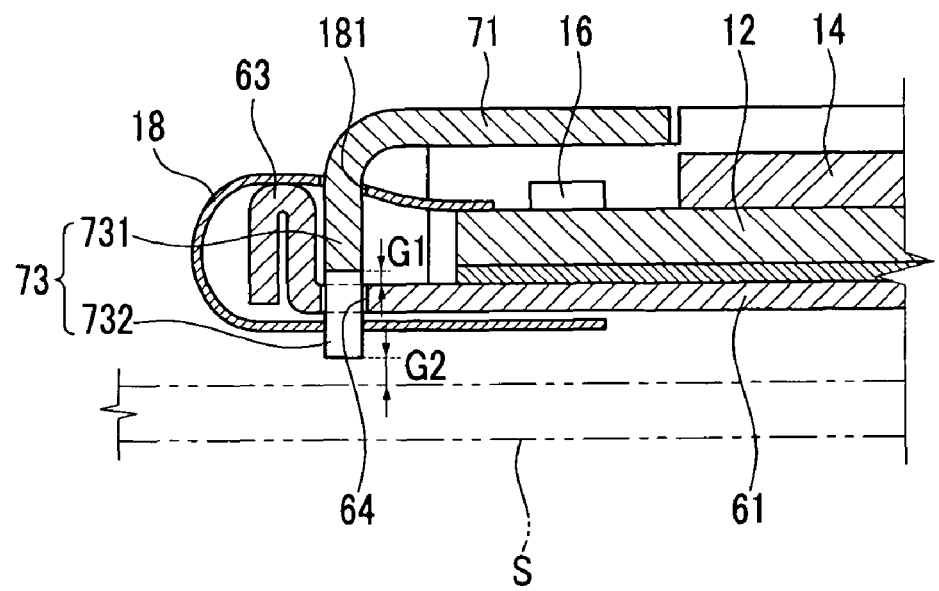
FIG. 12 is a cross-sectional view of FIG. 11, taken along the sectional line V-V.

The first bezel 60 is disposed in a first substrate 12 side of the display panel 10, receives the display panel 10 attached by using an adhesive tape 80, and is installed in a set S (refer to FIG. 12). The adhesive tape 80 may be formed in a urethane form (that is, a microcellular polymer sheet) that can absorb impact.

The first bezel 60 includes a bottom portion 61 that is formed in a size that corresponds to the size of the display panel 10 for supporting the display panel 10, a skirt portion 62 formed to be bent to correspond to three sides of the display panel 10 in an area of the bottom portion 61 corresponding to a display area DA, and a hemming flange 63 formed being bent to correspond to one side other than the three sides of the display panel 10 in an area of the bottom portion 61 corresponding to the pad area PA.

The second bezel 70 is formed at a distance from the pad area PA on the pad area PA to cover the pad area PA, and is combined to the first bezel 60. The second bezel 70 is formed in a rectangular shape having a long side and a short side corresponding to the pad area PA. For example, the second bezel 70 includes an upper plate 71 that covers the pad area PA and a side plate 72 bent at lateral ends of the upper plate 71 and combined to the skirt portion 62 of the first bezel 60.

The first bezel 60 receives the display panel 10 and other internal parts while supporting them, and therefore it may be formed of a material having relatively high strength. For example, the first bezel 60 can be made of a metal material such as steel use stainless (SUS) having constant strength, steel plate cold commercial (SPCC), aluminum, and a nickel-silver alloy. However, the material of the first bezel 60 is not limited thereto.

The second bezel 70 may be made of a metallic material like the first bezel 60, or may be made of a resin material.

The first bezel 60 supports the display panel 10 by receiving the entire display panel 10, and the second bezel 70 protects the pad area PA of the display panel 10 by covering it. In addition, the first and second bezels 60 and 70 according to the present exemplary embodiment are formed to be able to absorb external pressure and impact applied to the second bezel 70.

Figure 9:
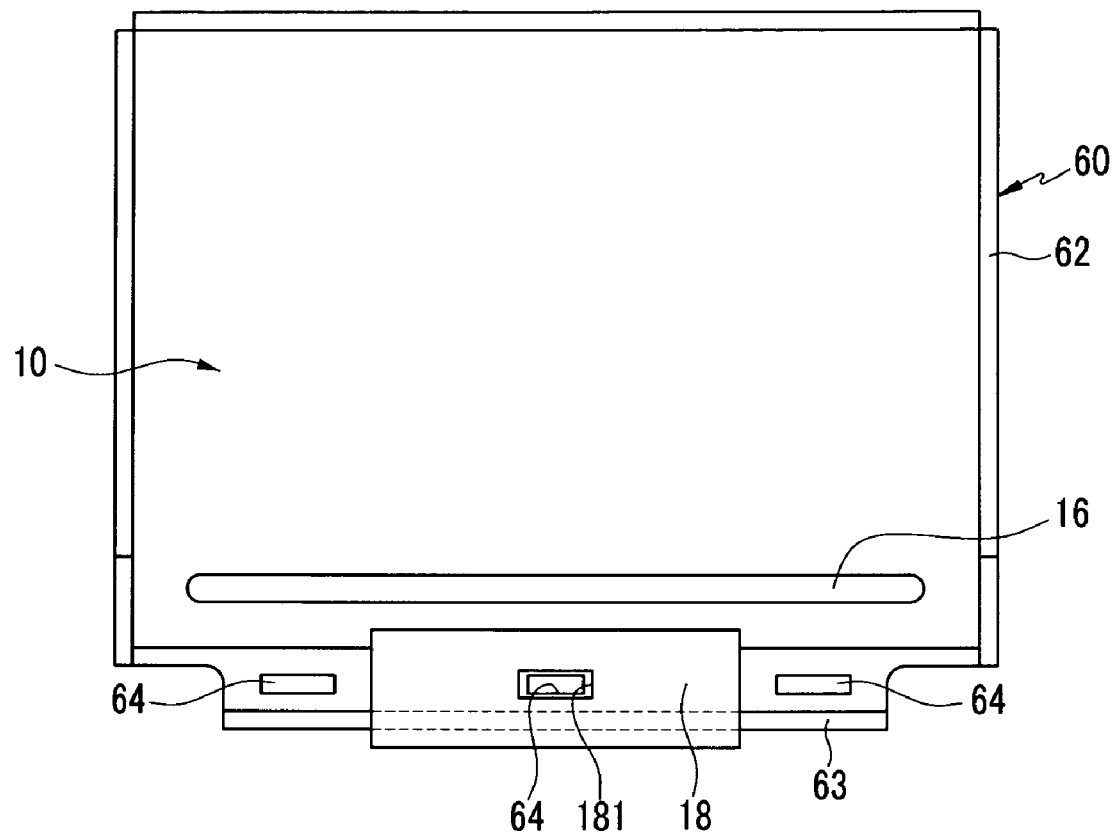
FIG. 9 is a top plan view of an assembled state of a first bezel and the display panel for the display device shown in FIG. 8.

FIG. 9 is a top plan view of combination of the first bezel and the display panel of FIG. 8. Referring to FIG. 9, the first bezel 60 forms a penetration hole 64 corresponding to the pad area PA side. That is, the penetration hole 64 is formed in a first bottom side 61 of a hemming flange 63 elongated to the x-axis direction corresponding to the pad area PA.

The penetration hole 64 may be provided in a plurality along the length direction of the hemming flange 63, and three penetration holes 64 are exemplarily shown in the drawing.

Typically, considering that an IC chip 61 is provided in a center of the pad area PA, the penetration holes 64 may be formed corresponding to lateral ends of the length direction and the center of the hemming flange 63.

In addition, when the IC hip 16 is provided in an area other than the center of the pad area PA, the penetration hole 64 may be formed in the center of the IC chip 16 in order to effectively protect the IC chip 16.

Referring back to FIG. 8, the second bezel 70 forms a protrusion 73 corresponding to the penetration hole 64. The protrusion 73 is inserted in the penetration hole 64, and absorbs external impact transmitted to the second bezel 62 while moving (to the z-axis direction) in the penetration hole 64.

Figure 10:
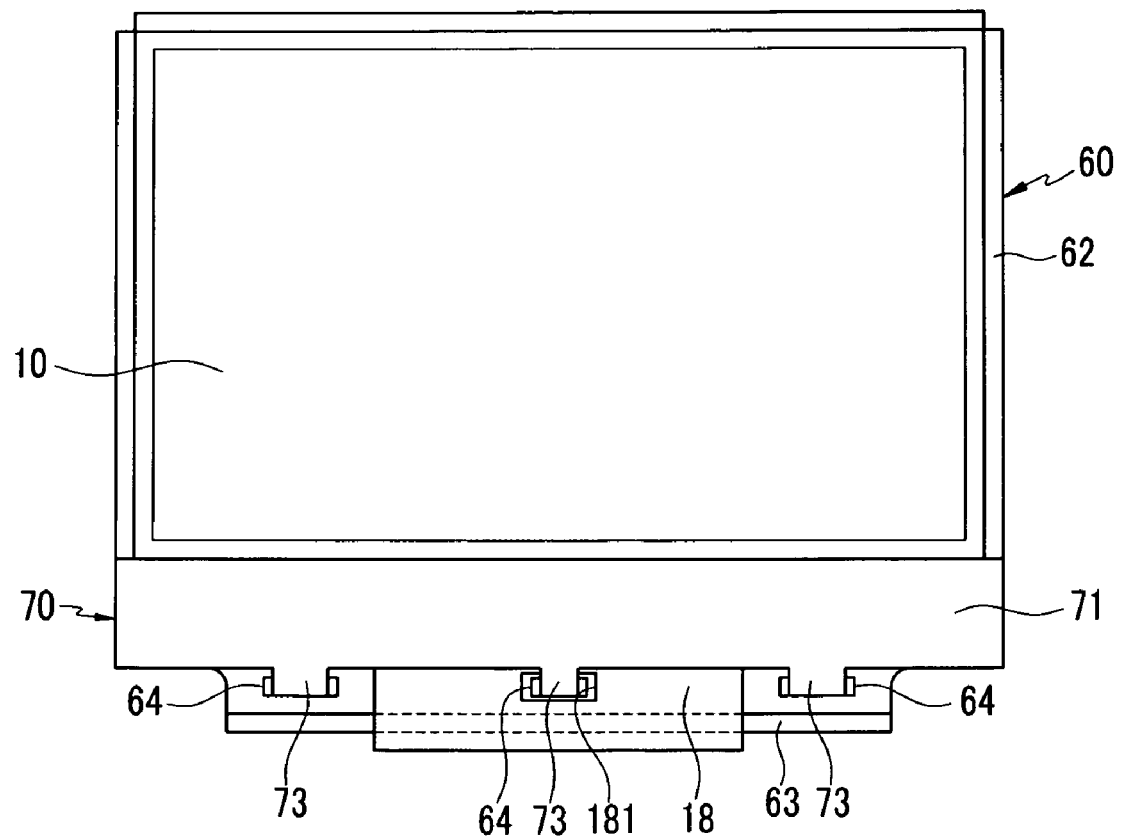
FIG. 10 is a top plan view of an assembled state of the first bezel, a display panel, and a second bezel for the display device shown in FIG. 8.
Figure 11:
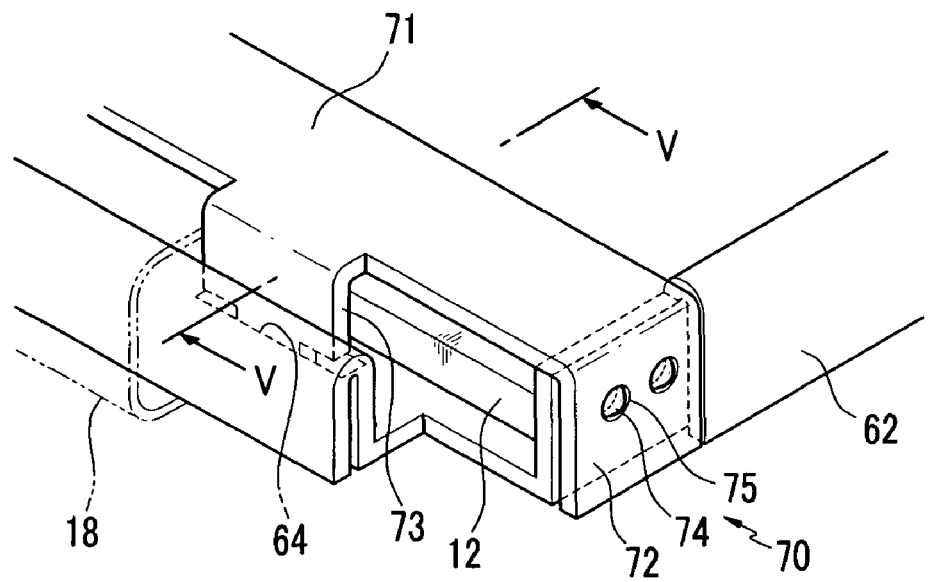
FIG. 11 is a partial perspective view of an assembled state of the first and second bezels for the display device shown in FIG. 8.

FIG. 10 is a top plan view of combination of the first bezel, the display panel, and the second bezel of FIG. 8, FIG. 11 is a partial perspective view of combination of the first and second bezels of FIG. 8, and FIG. 12 is a cross-sectional view of FIG. 11, taken along the line V-V.

Referring FIG. 10 to FIG. 12, the protrusion 73 is bent in the hemming flange 63 side of the upper plate 71 and protruded toward the penetration hole 64 formed in the bottom portion 61. The protrusion 73 is partially inserted in the penetration hole 64, and a range for insertion and movement of the protrusion 73 can be adjusted.

For example, as shown in FIG. 8, the protrusion 73 is bent toward the bottom portion 61 from the upper plate 71, and includes a wide width portion 731 connected to the upper plate 71 and a narrow width portion 732 connected to the wide width portion 731.

In the protrusion 73, the wide width portion 731 is formed toward the penetration hole 64 of the bottom portion 61 from the upper plate 71 and is larger than the width of the penetration hole 64 in width, and is located outside the penetration hole 64 and determines a range of insertion and movement of the protrusion 73 within the penetration hole 64. Even when a boundary of the wide width portion 731 and the narrow width portion 732 contacts the pad area PA, the upper plate 71 is maintained in the state of not contacting the pad area PA in order to protect the pad area PA.

In a free condition in which external pressure and impact are not applied to the upper plate 71, the wide width portion 731 of the protrusion 73 and the bottom portion 61 around the penetration hole 64 form a first gap GI interposed therebetween (refer to FIG. 12). That is, within a range of the first gap G1, the wide width portion 731 can move toward the penetration hole 64.

The narrow width portion 732 is extended from the wide width portion 731 and is formed to be smaller than the wide width portion 731 and the penetration hole 64 in width, and thus it is located inside the penetration hole 64 and enables the protrusion 73 to absorb impact while moving to the z-axis direction in the penetration hole 64. That is, within the range of the first gap G1, the narrow width portion 732 can be moved in the penetration hole 64.

In addition, the narrow width portion 732 of the protrusion 73 penetrates the penetration hole 64 and further protrudes to the rear side of the bottom portion 61. In a free condition, the set S that supports the bottom portion 61 and the narrow width portion 732 form a second gap G2 interposed therebetween. The first gap G1 may be set to be less than the second gap G2.

When the first gap G1 and the second gap G2 are set to be the same in size, external pressure and impact transmitted to the second bezel 70 are simultaneously absorbed in the first and second gaps G1 and G2. Residual impact that is not absorbed in the first and second gaps G1 and G2 may be transmitted to the set S through the narrow width portion 732 and absorbed therein.

When the first gap G1 is smaller than the second gap G2 in size, the external pressure and impact transmitted to the second bezel 70 are simultaneously absorbed in the first and second gaps G1 and G2. Residual impact that is not absorbed in the first and second gaps G1 and G2 may be transmitted to the set S through the narrow width portion 732 while transforming the upper plate 71 and the bottom portion 61 within a durability range of the OLED display 600, and absorbed in the set S.

The second bezel 70 and the first bezel 60 are combined to each other to absorb the external pressure and impact transmitted to the second bezel 70, and the FPC 18 connected to the display panel 10 has a structure in which the protrusion 73 of the second bezel 70 can be combined with the penetration hole 64 of the first bezel 50.

Referring to FIG. 9 and FIG. 10, the FPC 18 is connected to the area PA and bent to the rear side of the bottom portion 61 of the first bezel 60 while surrounding the hemming flange 63, and forms a protrusion hole 181 corresponding to the protrusion 73 of the second bezel 70.

The protrusion hole 181 of the FPC 18 faces at least one of the plurality of penetration holes 64. Referring to FIG. 10, a center protrusion 73 among the protrusions of the second bezel 70 matches the protrusion hole 181.

The protrusion 73 in a center portion of the second bezel 70 sequentially penetrates the protrusion hole 181 of the FPC 18 and the penetration hole 64 of the bottom portion 61 for combination. The protrusion hole 181 is formed to be greater than the size that corresponds to the wide width portion 731 such that the wide width portion 731 of the protrusion 73 can pass therethrough. That is, the width of the protrusion hole 181 of the FPC 18 is set to be greater than the width of the penetration hole.

Although the protrusion hole 181 and the number of protrusions 181 limit forming of a circuit pattern, the number of protrusions 181 can be appropriately selected in accordance with a circuit pattern technique and a material of the second bezel 70 since protection of the pad area PA can be reinforced by the second bezel 70.

In the present exemplary embodiment, the second bezel 70 further effectively protects the pad area PA by combining three sides among four sides that correspond to the pad area PA to the first bezel 60. That is, the second bezel 70 is fixedly combined to the skirt portion 62 of the first bezel 60 at lateral ends of the pad area PA, and is elastically combined to the first bezel 60 in one side of the pad area PA, which is an opposite side of the display area DA.

Referring back to FIG. 8 to FIG. 11, the skirt portion 62 of the first bezel 60 forms an externally protruded combining protrusion 65. A side plate 72 of the second bezel 70, facing the skirt portion 63, forms a combining hole 74 corresponding to the combining protrusion 65.

Referring to FIG. 10 to FIG. 12, by combining the combining protrusion 65 of the skirt portion 63 to the combining hole 74 of the side plate 72, the second bezel 70 is combined to the first bezel 60 and, in this case, the protrusion 73 is inserted in the penetration hole 64. That is, the upper plate 71 of the second bezel 70 protects the pad area PA by covering it, and the protrusion 73 absorbs the external pressure and impact while moving in the penetration hole 64.

As described, according to the fourth exemplary embodiment of the present invention, the second bezel is combined to the first bezel by inserting the protrusion of the second bezel covering the pad area in the penetration hole of the first bezel, and therefore the external pressure applied to the second bezel can be absorbed by interaction between the penetration hole and the protrusion. Therefore, the pad area connected to the FPC can be protected from the external pressure and impact.

In addition, according to the fourth exemplary embodiment of the present invention, the first gap is formed between one side of the protrusion and the first bezel of the penetration hole, and when the external impact is applied, the first gap is reduced and the protrusion is supported by the set through the penetration hole so that the impact transmitted to the second bezel in the pad area side is transmitted to the set. Accordingly, the external impact transmitted to the second bezel can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An organic light emitting diode (OLED) display device, comprising:
    a display panel including a display area and a pad area;
    a first bezel that receives the display panel; and
    a second bezel combined to the first bezel in the display panel side where the pad area is formed.

2. The OLED display device of claim 1, wherein the second bezel is detachably combined to a side of the first bezel.

3. The OLED display device of claim 1, wherein the second bezel is combined only to a side of the first bezel corresponding to the pad area.

4. The OLED display device of claim 1, wherein the first bezel comprises a bottom portion, a first skirt portion formed by being protruded from an edge of the bottom portion, and a cut-out skirt portion formed by being partially cut out from the first skirt to the pad area, and the second bezel comprises a second skirt portion and a bent portion that is bent from the second skirt portion.

5. The OLED display device of claim 4, wherein an additional skirt portion having a locking projection is formed in a side of the first skirt portion, and the bent portion is inserted in the locking projection.

6. The OLED display device of claim 4, wherein the first skirt portion comprises a plurality of protrusions, the second skirt portion comprises a plurality of holes respectively corresponding to the plurality of protrusions, and each of the protrusions is combined to the corresponding hole.

7. The OLED display device of claim 4, wherein a front end of the bent portion forms a supporting unit by being bent to be aligned in parallel with the bottom portion.

8. The OLED display device of claim 7, wherein the supporting unit is disposed on the pad area.

9. The OLED display device of claim 7, further comprising a touch panel disposed on the display panel,
    wherein the touch panel is supported by the supporting unit.

10. The OLED display device of claim 1, wherein the first bezel comprises a bottom portion, a first skirt portion formed by being protruded from an edge of the bottom portion, and a cut-out skirt portion formed by being partially cut out from the first skirt, and the second bezel comprises a cover portion that covers the pad area and a second skirt portion formed by being protruded from an edge of the cover portion.

11. The OLED display device of claim 10, wherein the first skirt portion and the cut-out skirt portion comprise a plurality of protrusions, a plurality of holes are formed in the second skirt portion corresponding to the plurality of protrusions, and each of the protrusions are combined to the corresponding hole.

12. The OLED display device of claim 1, wherein strength of the first bezel is different from that of the second bezel.

13. The OLED display device of claim 1, wherein the first bezel includes a material selected from a group of steel use stainless (SUS), steel plate cold commercial (SPCC), aluminum, and a nickel-silver alloy.

14. The OLED display device of claim 1, wherein the display device is a portable device.

15. An organic light emitting diode (OLED) display device, comprising:
    a display panel including a display area and a pad area that is formed in one side of the display area;
    a first bezel that receives the display panel; and
    a second bezel combined to the first bezel on the pad area to form a gap with the pad area,
    wherein the first bezel comprises a penetration hole formed corresponding to the pad area, and
    wherein the second bezel comprises a protrusion formed corresponding to the penetration hole in order to absorb external pressure applied to the second bezel while moving in the penetration hole.

16. The OLED display device of claim 15, wherein the first bezel comprises:
    a bottom portion that supports the display panel;
    a skirt portion formed being bent to correspond to three sides of the display panel in an area of the bottom portion and that corresponds to the display; and
    a hemming flange formed to be bent to correspond to one side other than the three sides of the display panel in an area of the bottom portion, corresponding to the pad area, and
    the penetration hole is formed in one side of the hemming flange of the bottom portion.

17. The OLED display device of claim 16, wherein:
    the second bezel comprises an upper plate that covers the pad area and a side plate that is bent from lateral ends of the upper plate and combined to the skirt portion of the first bezel, and
    the protrusion is protruded toward the penetration hole bent from the hemming flange side in the upper plate and formed in the bottom portion.

18. The OLED display device of claim 17, wherein the penetration hole is formed in plural along the length direction of the hemming flange.

19. The OLED display device of claim 18, wherein the penetration hole is formed to correspond to at least lateral ends of the length direction and a center of the hemming flange.

20. The OLED display device of claim 19, wherein the penetration hole is formed to correspond to a center of an integrated circuit (IC) chip provided at least in the pad area.

21. The OLED display device of claim 17, wherein the protrusion comprises
    a wide width portion that is bent to the penetration hole in the upper plate and formed to be wider than the width of the penetration hole, and
    a narrow width portion extended from the wide width portion and formed to be smaller than the width of the penetration hole so as to be combined to the penetration hole.

22. The OLED display device of claim 21, wherein the wide width portion of the protrusion and the first bezel of the penetration hole form a first gap interposed therebetween.

23. The OLED display device of claim 22, wherein the narrow width portion of the protrusion is penetrated through the penetration hole and protruded to the rear side of the bottom portion, and a set that supports the bottom portion and the narrow width portion form a second gap interposed therebetween.

24. The OLED display device of claim 23, wherein the first gap is set to be less than the second gap.

25. The OLED display device of claim 17, comprising a flexible printed circuit board (FPC) connected to the pad area and bent to the rear side of the bottom portion of the first bezel while surrounding the hemming flange,
wherein the FPC forms a protrusion hole that penetrates the protrusion of the second bezel.

26. The OLED display device of claim 25, wherein the protrusion hole faces at least one of a plurality of penetration holes.

27. An organic light emitting diode (OLED) display device, comprising:
a display panel including a display area and a pad area formed in one side of the display area;
a first bezel that receives the display panel; and
a second bezel formed in a square shape corresponding to the pad area, and
wherein the second bezel is combined to the first bezel in three sides among four sides that correspond to the pad area.

28. The OLED display device of claim 27, wherein the second bezel is fixed-combined to the first bezel at lateral ends of the pad area, and is elastically combined to the first bezel in one side of the pad area.

* * * * *